Aug. 11, 1931.  D. ROBERTSON  1,817,932
MEANS FOR USE IN THE EVACUATION AND SEALING
OF CONTAINERS FOR PERISHABLE PRODUCTS
Filed Jan. 25, 1929  2 Sheets-Sheet 1

INVENTOR
David Robertson
BY
Pennie Davis Marvin & Edmonds
ATTORNEYS

Aug. 11, 1931.  D. ROBERTSON  1,817,932
MEANS FOR USE IN THE EVACUATION AND SEALING
OF CONTAINERS FOR PERISHABLE PRODUCTS
Filed Jan. 25, 1929   2 Sheets-Sheet 2

INVENTOR
David Robertson
BY
Pennie Davis Marvin & Edmonds
ATTORNEYS

Patented Aug. 11, 1931

1,817,932

UNITED STATES PATENT OFFICE

DAVID ROBERTSON, OF WELLINGTON, NEW ZEALAND, ASSIGNOR TO VACUUM PRODUCTS (N. Z.) LIMITED, OF WELLINGTON, NEW ZEALAND, A COMPANY OF NEW ZEALAND

MEANS FOR USE IN THE EVACUATION AND SEALING OF CONTAINERS FOR PERISHABLE PRODUCTS

Application filed January 25, 1929. Serial No. 334,903.

This invention relates to means devised for use in carrying out a process of treating perishable products, particularly cheese or other dairy food products, in which the said products are placed in air tight containers and the air then evacuated from the container and the container sealed against air entry so that a vacuum condition is produced to preserve the said product during its storage and (or) transport.

The said process of withdrawing the air from the container is designed to be effected through a minute aperture made in a convenient part thereof, after the container has been closed and sealed, and this aperture is then in turn sealed to maintain the vacuum conditions.

The invention is concerned with means whereby the container is exhausted through the said minute aperture, and such aperture is then temporarily sealed to keep the vacuum, while a permanent sealing is effected. It embodies apparatus designed to work in conjunction with the above-mentioned process whereby the vacuum action is produced and maintained.

The said process of exhaustion is effected by the employment of a thin resilient disc that is placed over the aperture and held normally thereon by means of a spring contained within a specially constructed nozzle that is adapted to make airtight connection with the container surface and is also connected with the vacuum source through a special valve providing for such connection being made and broken and, when broken, for the admission of atmospheric pressure to the nozzle.

The means for producing the vacuum used with such method embody a cylinder to which a branch pipe carrying the said nozzle is connected and in which the vacuum is produced and maintained by special means hereinafter described. Such cylinder may be fitted with a multiple number of the said branches and nozzles to allow of several containers being simultaneously operated upon.

In fully describing the invention, reference will be made to the accompanying sheet of drawings, in which:—

10 is an airtight cylinder of any desired capacity that is disposed vertically upon a stand 11 of suitable design. Extending vertically through the cylinder from end to end, is a fluid conveying pipe 12, the upper end of which is connected with some pressure source while the lower end leads away to exhaust. In most instances the fluid employed may be water, conveyed to the pipe 12 from a pressure supply so that it will pass with force through the said pipe. Air or steam may however also be used.

Figure 4:
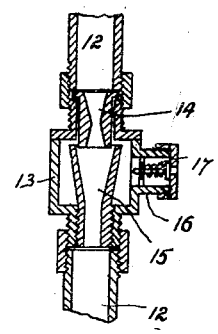
Figure 4 is an enlarged sectional elevation of air ejector means embodied in the vacuum cylinder.

Fitted into the pipe 12, within the cylinder and preferably near the upper end thereof, is an ejector apparatus 13 made on well known lines and containing a Venturi tube 14 and velocity nozzle 15 (Figure 4). This apparatus has a branch 16 leading sideways from its chamber and such branch is provided with a non-return valve 17 capable of opening inwards into it, but closing against any return opening. The force of the fluid passage through the apparatus will therefore induce a flow of the air from the cylinder body through the valve 17 in a well known way, in order to obtain and maintain vacuum conditions within such cylinder.

No special claim is made for this ejector apparatus and method of obtaining and maintaining a vacuum within the cylinder, as such are already well known in the art and are used in this invention as being most suitable for the purpose.

The cylinder may have a drain cock opening 18 in its bottom end into which a suitable drain cock 19 is fitted for the purpose of drawing away any liquid that may collect in the cylinder.

Figure 1:
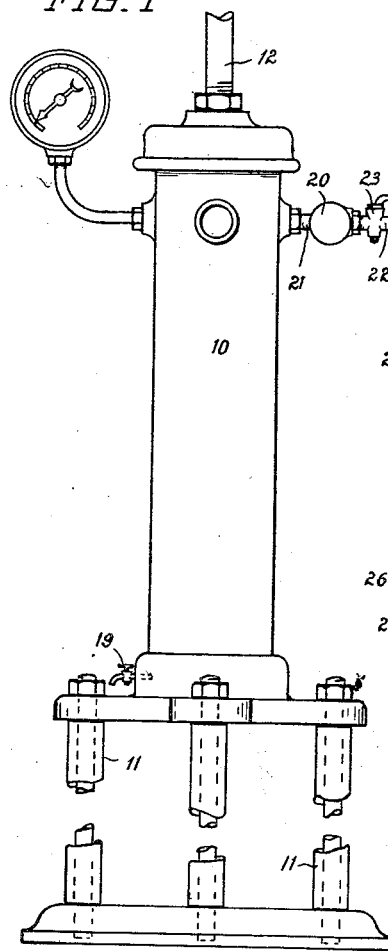
Figure 1 is an elevation of the whole apparatus.
Figure 2:
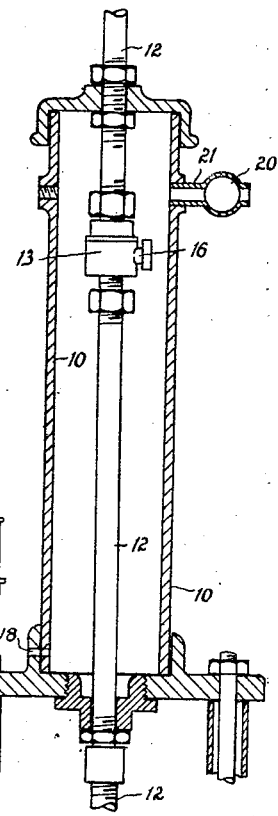
Figure 2 is a sectional elevation of the vacuum cylinder portion thereof.
Figure 5:
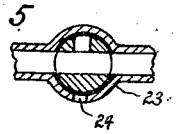
Figure 5 is a sectional plan of a valve suitable for controlling the operations of the apparatus.
Figure 3:
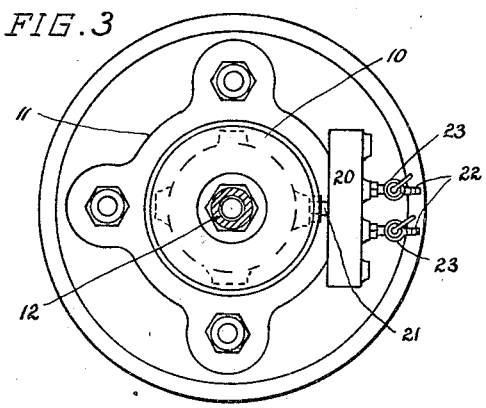
Figure 3 is a plan thereof.

A horizontally extending manifold chamber 20 is arranged outside the upper end of the cylinder 10 and is connected therewith by a connection 21 and this chamber is provided with any desired number of nipple fittings 22 opening therefrom and each one of which is governed by a cock 23. Such cock is so made that it may open the nipple to the chamber 20, or to the atmosphere while cutting off the connection to the chamber, as by forming it in the manner shown in Figure 5 with its plug formed with three ways and its plug casing with a side port 24 therein.

Upon each nipple, one end of a flexible pipe 25 is passed, this pipe being made of any length required to suit the circumstances surrounding the use of the appliance.

On the other end of this pipe the exhausting nozzle 26 is fitted, such nozzle being generally of cylindrical form and having its lower end provided with a projecting rubber ferrule 27 so that airtight connection may be established between such edge and the surface of a container 28 on to which it may be pressed.

This nozzle is made of special form providing for a plunger 29 being mounted to slide longitudinally through it and to project from its lower end, such plunger being spring controlled, as by the compression spring 30, to be normally forced outward at its lower end for a distance beyond the end of the nozzle cylinder. It is made with a bore 31 extending right throughout its length so that the air may pass through it in both directions. Its fitting into the lower end of the nozzle also is made such as to ensure of air passages around it into the nozzle body. The plunger is retained from turning in the nozzle by suitable means, as the screw pin 32 screwed radially in through the body and entering a longitudinal groove 33 formed in the plunger surface.

The plunger is designed to be forced inward against its spring 30 and to be held by providing it with a spring tooth 34 that extends down along its outer surface and has a free outer end that normally projects radially outward. The inside surface of the body is formed with a notch 35 into which this spring end enters when the plunger is pushed up to the requisite distance and by its engagement retains the plunger in the retired position. These are so adjusted that the plunger, when held by the spring tooth 34, is capable of a limited amount of longitudinal movement within the nozzle, being cushioned against upward movement by means of the spring 30 and also having its lower end projecting slightly below the nozzle bottom. It is adapted to be freed so that it may spring out under its spring action and for the distance provided for by forming its lower end with a shoulder 36 that engages a shoulder 37 in the nozzle end, through the action of a trigger finger press 38 that is mounted in a gland guide 39 fitted on the nozzle body and extends radially inward to contact with the lower end of the spring 34 when the plunger is raised. By pushing this trigger inwardly, the spring end is forced out of engagement with the notch 35, thus allowing the plunger to slide out.

Figure 6:
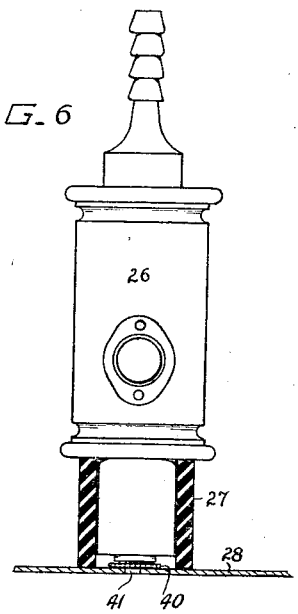
Figure 6 is an elevation of the nozzle and its parts, in position over a disc and container aperture.
Figure 7:
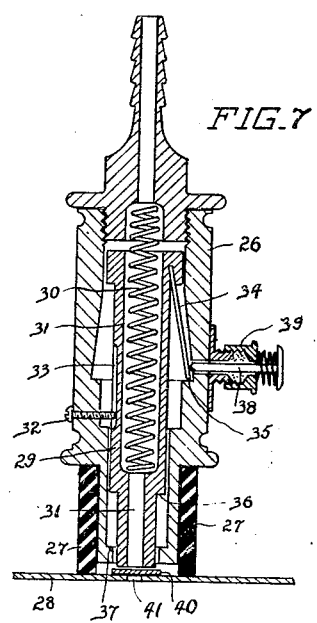
Figure 7 is a sectional elevation thereof.

In the use of the apparatus therefore, vacuum conditions having been established in the cylinder 10 by the means provided, a rubber or like resilient disc 40 (Figure 6) is placed over the aperture 41 in the container 28. The nozzle 26 with the plunger 29 pressed in to be held by the spring 34 has its end pressed on to the container so that the disc is surrounded by the rubber ferrule and the plunger engages the disc 40 to force it down closely over the aperture. Connection is then made with the cylinder by turning the cock 23 to the appropriate position. The vacuum suction will therefore cause the disc and the plunger to lift so that the air will be drawn from the container, out through the aperture 41. When the air has been thereby exhausted from the container, the cock 23 is operated to shut off the vacuum connection and to admit air to the pipe and nozzle. This will allow the spring 30 to act first to force the plunger and the disc back on to the aperture, and will then break down the vacuum in the nozzle so that it may be lifted from off the disc, leaving the disc held tightly on the container by reason of the atmospheric pressure acting upon it. This will hold the disc seal in place until such time as it is covered over by the permanent sealing solder, which is placed over the disc as well.

In order that the disc 40 shall be caused to make positive engagement with the aperture 41 before the fitting is lifted clear, the plunger may be freed from its detent spring 34 by actuating the trigger 38, when it will spring out and its end deliver a slight blow to the disc to force it on to the aperture and to continue to hold it there while the nozzle is being lifted from around it.

In some cases, the disc may be formed with a small central piercing which will open with the upward stretch of the rubber under the influence of the vacuum suction, to permit of the air passing out and will then automatically close by its own resiliency when such suction is cut off.

I claim:—

An apparatus for evacuating closed receptacles comprising a nozzle provided with a central bore and having means for connection to an air exhausting device, a ferrule mounted in one end of the nozzle in concentric relation to the bore of the nozzle and being arranged to be pressed into air-tight contact around an aperture in the receptacle to be evacuated, a hollow plunger slidably positioned within the bore and communicating with the nozzle and adapted to hold by suction a loose disk in an elevated position over the aperture in the receptacle, resilient means for normally projecting the plunger to a position in which one end extends beyond the ferrule, means for latching the plunger in retracted position against the thrust of the resilient means, and means to release the latch to cause the plunger to be projected forwardly by the resilient means.

In testimony whereof, I affix my signature.

DAVID ROBERTSON.